March 16, 1948.          G. A. GIANNUZZI ET AL          2,438,046
PROCESS FOR MAKING ELECTRICAL UNITS, SUCH AS COMMUTATORS
Filed Feb. 2, 1945

INVENTORS.
G. A. GIANNUZZI
K. J. MILLER
BY

Patented Mar. 16, 1948

2,438,046

UNITED STATES PATENT OFFICE 2,438,046

PROCESS FOR MAKING ELECTRICAL UNITS, SUCH AS COMMUTATORS

George A. Giannuzzi, Vestal, and Kenneth J. Miller, Binghamton, N. Y., assignors to International Business Machines Corporation, New York, N. Y., a corporation of New York Application February 2, 1945, Serial No. 575,916

3 Claims. (Cl. 29—155.54)

1

This invention relates to electrical units and particularly to a novel method and process of construction of a unit.

The unit disclosed herein is employed as an electrical instrumentality in an electric accounting machine and is known in the art as a commutator readout unit, or an emitter, depending upon its function. When used as an emitter, it is used as a source means to transmit timed digit representing impulses and when used as a digit readout it determines the digit representing impulse to be transmitted. Such functions are conveniently exemplified in the Daly Patent No. 1,861,955, dated June 7, 1932. The thickness of such units was not of importance in the machine of this patent but at the present time it is of prime importance in the construction and design of present commercial electric accounting machines, particularly since the time of the patented machine the denominational orders of such units have increased to such a number that an accounting machine would be inordinately large if units previously devised were employed. While the present unit is devised as a solution to the above problem, its incorporation is not necessarily confined to this form of machine and may answer the requirement for the design of a similar unit in any other form of machine.

It is a broad object of the present invention to devise an electrical commutator unit which is practical in assembly, fabrication and relatively thin so that a number of such units may be assembled in a narrow space, such as, about twelve to the inch.

The object of the invention is to devise a process of fabrication of an electrical unit which consists in the forming of a central metal plate with closed slots, molding insulating material in said slots or filling said slots flush with the surfaces with an insulating cement, bonding to each surface of the central metal plate thin insulating side or cover plates to provide a rigid unit, and externally machining the edges of the unit to cut away the closed ends of the slots to provide from said metal plate isolated contact making portions insulated from each other by the intermediate material molded or filled in the slots.

While the unit formed by the herein described process consists of a commutator unit, other electrical units may be fabricated by the same process without departing from the spirit of the invention.

Other objects of the invention will be pointed out in the following description and claims and illustrated in the accompanying drawings, which

2 disclose, by way of example, the principle of the invention and the best mode, which has been contemplated, of applying that principle.

Figure 1:
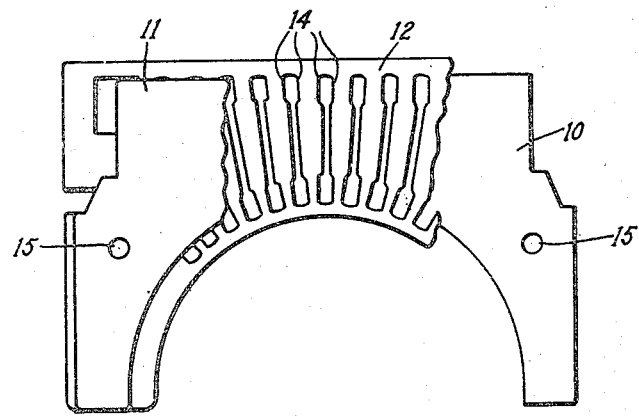
Fig. 1 is a fragmentary view in side elevation of the commutator unit with the three parts assembled prior to a machining operation.

The electrical unit consists primarily of three pieces; 10 and 11 representing relatively thin plates of insulating material blanked out from a plate of laminated phenolic material about .020" thick, the particular material varying with the requirements with respect to insulating qualities, rigidity, ease of machining, etc. The above designated laminated phenolic material is a commercial article whose properties are well known. Blanked out plates 10 and 11 are the side pieces or covers of the electrical unit and intermediately disposed is a center plate 12 which may be blanked out from a sheet of metal to the desired configuration but in view of the fact that it provides the contact portions and gives rigidity to the unit it is with respect to side pieces 10, 11, relatively thicker, and about .045 is suggested. Aside from being blanked out to give the desired external configuration, the metal plate 12 is blanked internally to provide a series of closed slots 14, the particular shape depending upon the form and spacing of metal contacts to be formed by the subsequent machining. Preferably such slots 14 are closed at both ends, i. e., the metal plate or insert 12 surrounds the slots 14 to provide a series of closed slots in which a liquid cement or insulating plastic may be flowed.

In view of the assembly process hereinafter described, it is preferable that the metal inserts 12 be clean and free of oil or grease, and any suitable degreasing process may be followed, such as washing in a grease dissolvent solution and subsequently drying by an air blast.

Such cleaned inserts 12 are now ready to have their slots 14 filled and are impregnated or filled with a suitable molding material or insulating plastic. The excess material on the surfaces is wiped off and when dry the surfaces are made flush by a sanding operation. After the surfaces of the insert have been sanded the insert 12 can be handled for subsequent fabrication, care being taken in handling them to avoid the possibility of getting oil or grease on the surfaces For extreme caution another degreasing and cleansing operation can be effected before the next step in the process, preferably a vapor degreasing operation of short duration at a temperature of 180° F. in trichlorethylene, followed by blow-off with air.

Thereafter, a suitable cement is applied by a brush to each face of the metal insert 12 and the same cement is applied to one clean face of the outside plates 10, 11 and parts may then be air dried, followed by an oven drying at a temperature and for a duration depending upon the cement used.

At this point the three pieces 10, 11, 12 are assembled, as shown in Fig. 1, and to facilitate assembly and fabrication locating holes 15 may be provided in all pieces. When aligned by holes 15 the parts are, relative to each other, properly positioned and are then compressed or bonded together by application of pressures between 200 and 300 lbs. per square inch, at a temperature of 325° F. for about fifteen minutes using the cement. As a result of this bonding operation, a rigid electrical unit is provided, the unit also conforming to the requirements as to over-all thickness and electrical properties.

Figure 2:
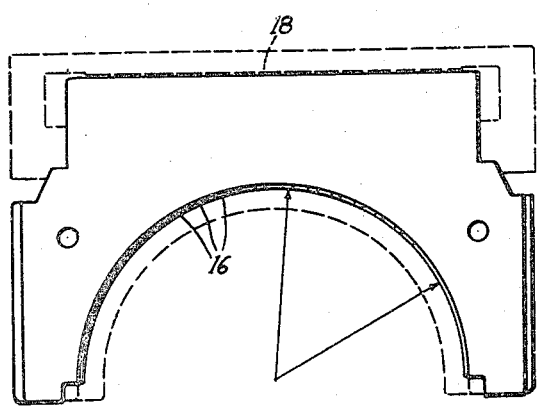
Fig. 2 is a view in side elevation, showing by dotted lines the parts machined away to form a completed unit.
Figure 3:
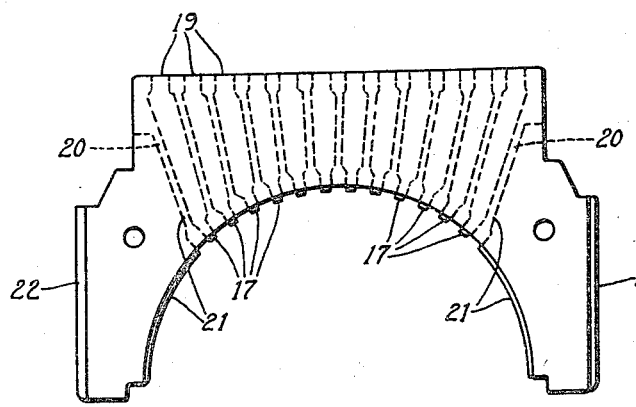
Fig. 3 is a view similar to Fig. 2, showing in side elevation a fabricated unit.

The rigid unit can now be machined without any unusual machining operations. Fig. 2 represents in upper dotted lines the portions removed by cutting, or blanking. The center and diameter of the circular cutting operation for fabricating the lower part are also designated in Fig. 2. Cutting portions along a circular line or arc will ultimately reach the filled-in slots, cutting the ends of the slots away and the surrounding metal thus producing isolated contact portions 17 from the metal insert 12. For an extended external projection of such isolated contact portions insulating material 16 intermediate them are removed by a transverse cutting operation. Thus, the isolated contact portions 17 (Fig. 3), project away from the plates to enable proper electrical contact with a rotating brush, switch lever, etc., rotating about the designated center. The top transverse cutting line 18 (Fig. 2) cuts away the material in the filled-in slots, producing isolated upper contact portions 19, but these can remain flush with the upper edge of plates 10, 11. If so desired, the upper edge of the unit can also be machined to form projecting contact portions like 17 of Fig. 3.

The irregular end slots designated 20 are also filled in as above described and when the unit is machined as above described they provide isolated end metal portions 21, each of an irregular shape. The external portions 22 can be used to cooperate with narrow slots in a mounting bar to adjacently mount the manufactured units, since portions 21—22 are isolated and insulated from other current carrying parts of the commutator.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. The method of manufacturing an electrical unit which consists of cutting out from a plate of insulating material cover plates of a desired external configuration, cutting out from a metal insert plate of substantially the same configuration a plurality of internal slots closed by surrounding metal at least at one end, filling or molding said slots flush with the surfaces of the insert plate with an insulating material which subsequently hardens, cementing said cover plates to each side of the intermediate metal plate, and then cutting the aligned edges of all three of said plates transversely across the closed ends of the slots to a point where the filled-in material at the closed ends of the slots is reached and cut away with said surrounding metal to provide a plurality of isolated metal contact point portions insulated and spaced from each other by said filled-in material.

2. The method of manufacturing an electrical unit which consists of cutting out from a plate of insulating material cover plates of a desired external configuration, cutting out from a metal insert plate of substantially the same configuration a plurality of internal slots closed at both ends by surrounding metal, filling or molding said slots flush with the surfaces of the metal insert with insulating material which subsequently hardens, cementing said cover plates to each side of the intermediate metal insert plate, and then cutting the aligned edges of all three of said plates transversely across both of the closed ends of the slots to a point where the filled-in material at both of the closed ends of said slots is reached and cut away with said surrounding metal to provide a plurality of isolated metal contact point portions insulated from each other by said filled-in material.

3. The method of manufacturing an electrical unit which consists of cutting out from a plate of insulating material cover plates of a desired external configuration, cutting out from a metal insert plate of substantially the same configuration a plurality of internal slots closed at both ends by surrounding metal, filling or molding said slots flush with the surfaces of the metal insert with insulating material, cementing said cover plates to each side of the intermediate metal insert plate, cutting the aligned edges of all three of said plates rectilinearly across one of the closed ends of the slots to a point where the filled-in material at said closed ends is reached and cut away with said surrounding metal, and cutting the aligned edges of all three of said plates curvilinearly across the other closed ends of the slots to a point where the filled-in material at said other closed ends is reached and cut away with said surrounding metal, to thereby provide a plurality of isolated metal contact portions insulated from each other by said filled-in material.

GEORGE A. GIANNUZZI.
KENNETH J. MILLER.

REFERENCES CITED

The following references are of record in the file of this patent:

UNITED STATES PATENTS

| Number | Name | Date |
| --- | --- | --- |
| 1,334,276 | Adams | Mar. 23, 1920 |
| 1,861,955 | Daly | June 7, 1932 |